Figure 1:
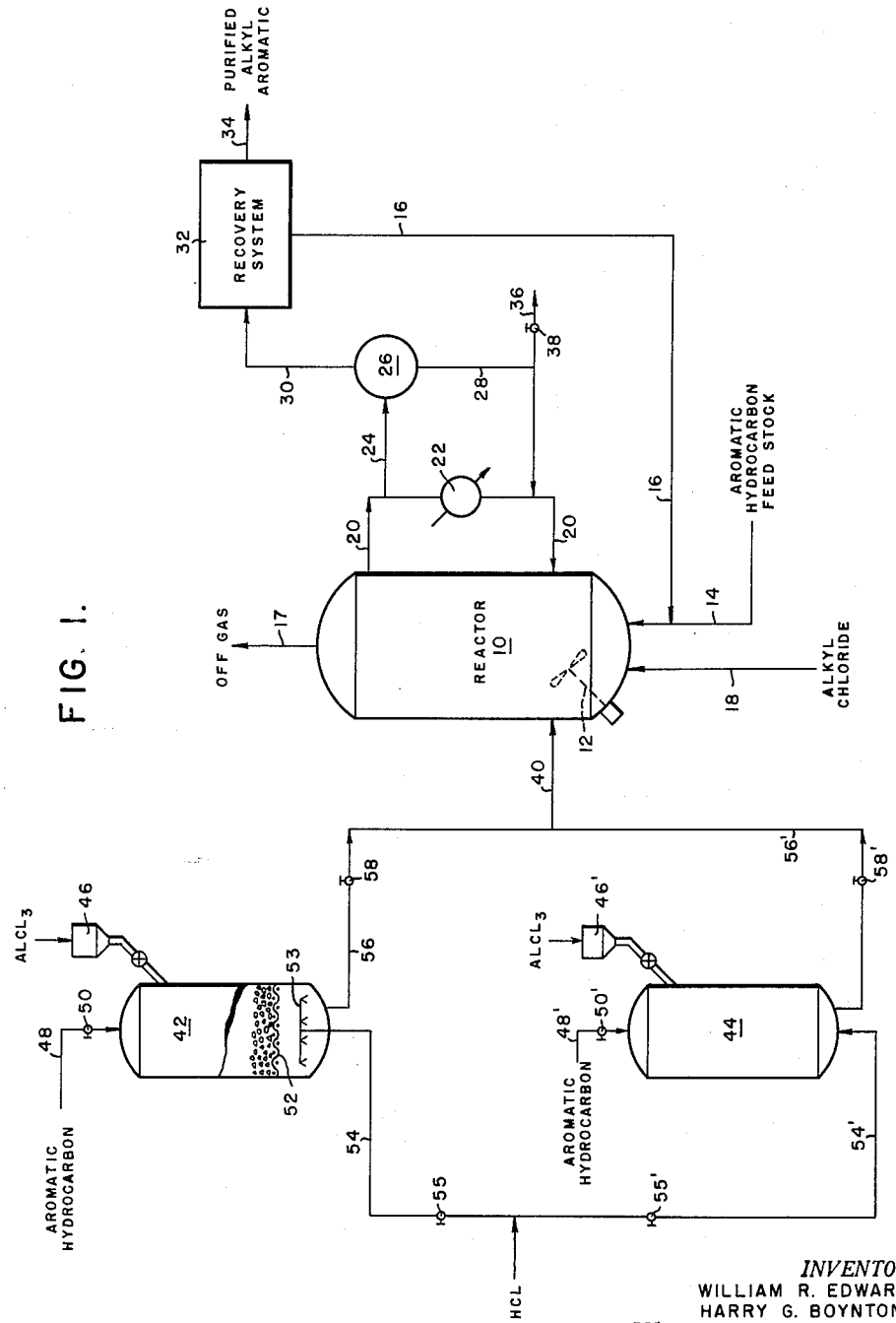

March 21, 1961 W. R. EDWARDS ET AL 2,976,335
METHOD OF MAINTAINING CATALYST ACTIVITY IN PREPARATION
OF METHYL AND ETHYL-SUBSTITUTED BENZENES
Filed Dec. 3, 1958 3 Sheets-Sheet 1

INVENTORS.
WILLIAM R. EDWARDS,
HARRY G. BOYNTON,
BY Carl G. Ries
ATTORNEY.

INVENTORS.
WILLIAM R. EDWARDS,
HARRY G. BOYNTON,
BY
ATTORNEY.

2,976,335

METHOD OF MAINTAINING CATALYST ACTIVITY IN PREPARATION OF METHYL AND ETHYL-SUBSTITUTED BENZENES

William R. Edwards, Baytown, Tex., and Harry G. Boynton, Berkeley Heights, N.J., assignors, by mesne assignments, to Esso Research and Engineering Company, Elizabeth, N.J., a corporation of Delaware Filed Dec. 3, 1958, Ser. No. 777,930

7 Claims. (Cl. 260—671)

This invention relates to a method for sustaining the activity of a catalyst employed in an alkylation process. More particularly, this invention relates to an improved process for alkylating an aromatic hydrocarbon with an alkyl chloride.

It is frequently desirable to alkylate benzene or a methyl or ethyl homologue thereof containing one replaceable hydrogen atom on the aromatic ring with methyl or ethyl chloride. A desired catalyst for this reaction is aluminum chloride inasmuch as the aluminum chloride will promote the alkylation reaction without extensive degradation of the feed stock. For this type of alkylation reaction, it is preferable to utilize an emulsion-type process wherein the aluminum chloride is formed into a complex (a heavy viscous liquid which is immiscible with the hydrocarbon feed).

This application contains subject matter in common with copending Earhart and Nicholson application Serial No. 777,931, filed December 3, 1958, and entitled "Process for Obtaining Durene."

A serious problem is encountered in conducting a continuous emulsion type alkylation process as set forth above in that the rate of alkylation normally tends to be comparatively low even when comparatively large throughputs of ethyl or methyl chloride are employed.

In accordance with the present invention, however, a highly efficient continuous process is provided wherein a preponderant amount of the alkyl halide is rapidly alkylated.

The present invention may be briefly described as an emulsion-type alkylation process wherein benzene or a methyl or ethyl homologue thereof containing at least one replaceable hydrogen atom is brought into contact with methyl or ethyl chloride under alkylation conditions in the presence of an aluminum chloride-containing complex and wherein alkylation activity is sustained by continually adding to the reaction mixture fresh aluminum chloride-containing complex in an amount within the range of 0.00015 to about 1.0 mol of aluminum chloride per mol of feed stock. It will be understood, of course, that a corresponding amount of complex will be continually removed in order to maintain a desired mol ratio of aluminum chloride to fresh feed within the reaction zone.

The feed stock for the present invention is selected from the class consisting of benzene and methyl and ethyl homologues thereof containing at least one replaceable hydrogen atom on the aromatic ring and mixtures of such aromatic hydrocarbons. By way of example, the feed stock may comprise benzene, a xylene, a trimethylbenzene, a tetramethylbenzene, a pentamethylbenzene, an ethylbenzene, a diethylbenzene, a triethylbenzene, a tetraethylbenzene, a pentaethylbenzene, or a mixture of two or more such benzenes. It is within the scope of the present invention to add methyl groups to an ethylbenzene or ethyl groups to a methylbenzene, or both. However, in general, methyl groups will be added to the methylbenzenes and ethyl groups will be added to the ethylbenzenes.

The alkyl chloride which serves as a source of methyl or ethyl radicals should be methyl chloride or ethyl chloride.

The catalyst to be utilized in accordance with the present invention is complexed aluminum chloride. The complex is formed by the interreaction of the aluminum chloride with an aromatic hydrocarbon and hydrogen chloride. The complex, as such, will contain equimolar amounts of the three ingredients and will normally have dissolved therein an additional mol of aromatic hydrocarbon. Thus, the emulsion phase, as such, will normally be characterized as containing aluminum chloride, hydrogen chloride, and an aromatic hydrocarbon in the ratio of about 1:1:2.

The amount of emulsion to be utilized in an alkylation zone should preferably be such that there is present within the reaction zone a total of from about 0.5 to about 0.04 mol of aluminum chloride per mol of aromatic. By way of example, if the aromatic is pseudocumene and the alkyl halide is methyl chloride and it is desired to produce a maximized amount of durene, the range may be such that there is present from about 0.4 to about 0.04 mol of aluminum chloride per mol of aromatic.

The reaction conditions to be employed in the alkylation zone will be dependent to a large extent on the chemical identity of the aromatic feed stock and the alkyl halide. For instance, with respect to temperature, it will be desirable to avoid temperatures wherein substantial volatilization of the aromatic components of the reaction occurs. Thus, for substantially atmospheric pressure reaction conditions, the upper limit for temperature will vary from aromatic to aromatic and will be approximately the atmospheric pressure boiling point of the aromatic. If superatmospheric pressures are to be employed, the temperature may be correspondingly increased. The lower temperature limit will likewise vary from aromatic to aromatic but will generally be at least 100° F. If the feed stock is a polymethylbenzene, it will generally be desirable to employ a temperature of at least 150° F. and for the more highly alkylated feed stocks such as trimethylbenzenes it will generally be desirable to employ temperatures in excess of 200° F.

The alkylation reaction is quite rapid. However, longer reaction times may be used to establish product equilibrium. Thus, at the lower temperatures comparatively long reaction times such as 1 to 2 hours may be employed whereas at temperatures in excess of 200° F. it will generally be preferable to employ a reaction time of less than about 30 minutes and at temperatures in excess of 250° F. it will be preferable to employ reaction times of less than 20 minutes.

The amount of methyl chloride or ethyl chloride to be employed will be largely dependent upon the number of alkyl groups to be added to the aromatic nucleus. Thus, if it is desired to convert xylenes into trimethylbenzens then about 1 mol of alkylating agent per mol of aromatic feed stock should be employed. If it is desired to add an average of 2 alkyl groups per aromatic nucleus (the conversion of xylenes to tetramethylbenzenes) then about 2 mols of alkyl chloride should be employed per mol of feed stock.

It will be understood that reactions other than alkylation will occur within the reaction zone. Thus, the aluminum chloride-containing emulsion will promote isomerization, transalkylation, and disproportionation of aromatic components of the reaction mixture whereby the reaction product will contain a mixture of alkyl aromatic hydrocarbons. However, degradation of the aromatic feed stock into coke and lower boiling non-aromatics is substantially completely avoided.

Under the aforesaid conversion conditions, it is possible to initiate an alkylation reaction which is characterized by a comparatively rapid consumption of the fresh alkyl halide. However, if there is no fresh addition of aluminum chloride emulsion, the activity of the catalyst with respect to alkylation will drop off at a rapid rate. In accordance with the present invention, however, fresh aluminum chloride-containing emulsion is continually added during the course of the reaction in an amount within the range of .00015 to 1.0 mol of fresh aluminum chloride per mol of hydrocarbon and a corresponding amount of "old" emulsion is withdrawn from the system.

More specifically, in accordance with the present invention, a separate body of aluminum chloride-containing emulsion is formed and the separate body of emulsion is continually added to the reaction zone at a predetermined rate while a corresponding amount of "old" emulsion is withdrawn from the reactor.

Still more preferably, the fresh emulsion is prepared by adding pelleted aluminum chloride to a liquid body of aromatic hydrocarbon in an amount such that not more than about 0.5 mol of aluminum chloride per mol of aromatic is present and by thereafter bubbling hydrogen chloride through the mixture for a period of time sufficient to cause the substantially complete solubilization of the aluminum chloride whereby the emulsion is formed.

Thus, a catalyst preparation vessel is provided which includes a grid intermediate the ends thereof for supporting aluminum chloride and means below the grid for introducing gaseous hydrogen chloride. Suitable means are also provided for introducing the aromatic hydrocarbon. In a vessel of this sort, the upflowing stream of hydrogen chloride will contact the solid aluminum chloride pellets to bring about a reaction wherein the liquid complex is formed. The liquid complex, as formed, will flow through the grid where it will be contacted with gaseous hydrogen chloride to make sure that all of the aluminum chloride is complexed.

Figure 2:
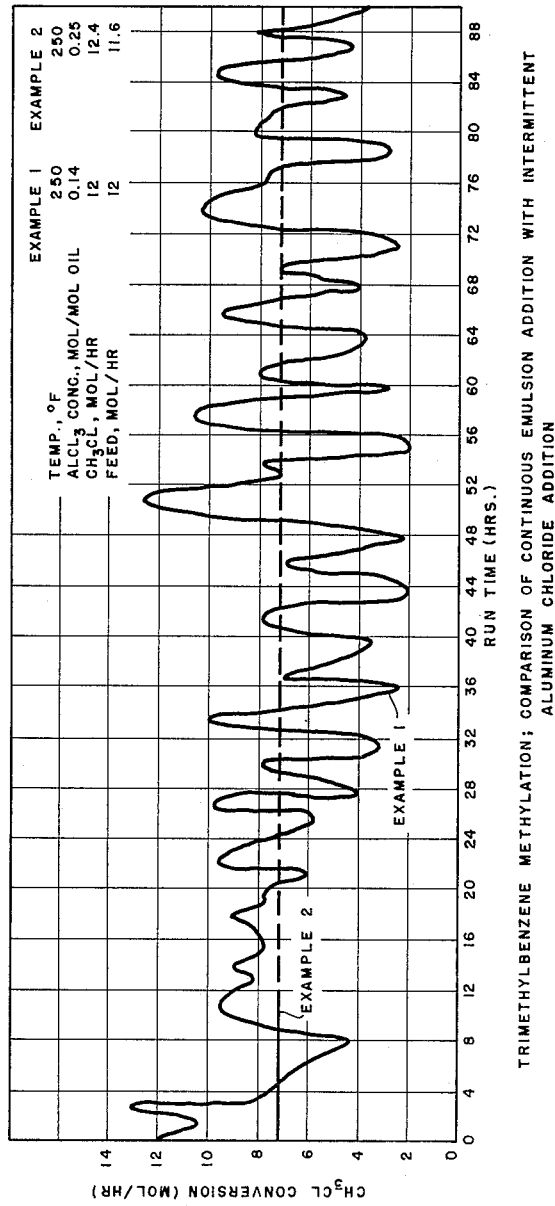
Figure 3:
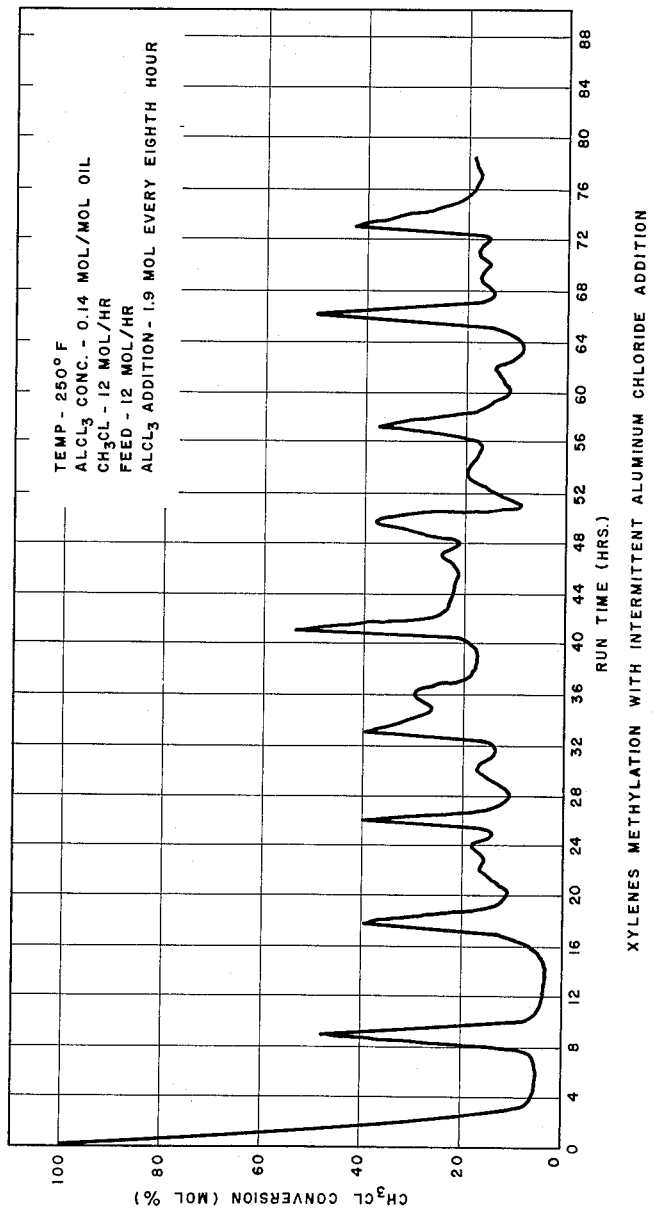

The invention will be further illustrated by the accompanying drawing wherein:

Fig. 1 is a schematic flow sheet illustrating a preferred method and apparatus for conducting the process of the present invention; and Figs. 2 and 3 are reproductions of graphs obtained during experimental evaluation of the process of the present invention.

Turning now to Fig. 1, there is provided a reactor 10 of any suitable construction which may be provided with suitable agitating means such as an impeller 12, if desired.

When continuous operations are to be conducted in the reactor 10, it is initially charged with an appropriate amount of an emulsion containing aluminum chloride, hydrogen chloride, and aromatic hydrocarbon in the mol ratio of about 1:1:2. For example, the amount of emulsion initially utilized in the reactor 10 may occupy about one-half of the reactor volume. If desired, the emulsion may be prepared in a manner to be described in connection with drums 42–44 and charged to the reactor by way of charge line 40.

An aromatic hydrocarbon feed stock such as pseudocumene is added to the reactor by way of a charge line 14 in admixture with recycle aromatic material obtained in a manner to be described which is added to the charge line 14 by way of the recycle line 16.

An alkyl chloride such as methyl chloride is added to the reactor 10 by way of an alkyl chloride charge line 18. There is initially placed within the reactor 10 an amount of aluminum chloride-containing emulsion sufficient to provide from about 0.4 to about 0.004 mol of aluminum chloride per mol of total feed stock whereby the methyl chloride is reacted with the aromatic hydrocarbon (pseudocumene) in order to form a tetramethylbenzene. Isomerization, disproportionation and transmethylation reactions will also occur whereby the oil phase of the mixture will comprise a mixture of polymethylbenzenes containing from about 1 to 6 methyl groups per aromatic ring.

The aforesaid reactions tend to be exothermic in nature and suitable means are therefore provided in order to maintain a predetermined desired reaction temperature. By way of example, a recycle stream 20 may be withdrawn from the reactor 10 and passed through suitable cooling means such as a heat exchange-type cooler 22 wherein the heat exchange material is cold water. A branch line 24 leading from the recycle line 20 to a settling drum 26 is provided in order to obtain a product stream from which a desired aromatic hydrocarbon such as durene is recovered. Within the settler 26 the material introduced by way of the line 24 separates under the influence of gravity into a liquid emulsion phase which is withdrawn by way of a bottoms line 28 for return to the recycle line 20. A supernatant oil stream 30 is withdrawn and charged to a recovery system 32 of any desired construction which may include, for example, washing facilities, distillation facilities and, if necessary or desired, fractional crystallization facilities. A suitable recovery system is shown, for example, in copending Earhart and Nicholson application Serial No. 777,931, filed December 3, 1958, and entitled "Process for Obtaining Durene." Since the recovery system, as such, does not constitute a part of the present invention, it is shown schematically in the drawing in the interest of simplicity.

The recovery system 32 will be such that there may be obtained a purified alkyl aromatic product such as high purity durene which is discharged by way of a line 34. The remainder of the aromatic components of the stream 30 are recycled from the recovery system 32 by way of the recycle line 16 to the reactor 10.

The reactor 10 is also provided with a vent line 17 through which unconsumed alkyl chloride and by-product hydrogen chloride may be withdrawn. It will be understood that the unconsumed alkyl chloride may be recovered for recycle, if desired, in any suitable manner (not shown).

In accordance with the present invention, "fresh" emulsion is continually added to the reactor and an equivalent amount of "old" emulsion is continually discharged from the reactor. The "old" emulsion may preferably be discarded by way of a branch line 36 controlled by a valve 38 leading from the bottoms emulsion draw-off line 28 for the drum 26.

The fresh emulsion is added at a predetermined rate within the range of about 0.00015 to about 1.0 mol of aluminum chloride per mol of fresh feed to the reactor 10, the fresh emulsion being separately added to the reactor 10 by way of a charge line 40.

The fresh emulsion is preferably prepared in at least a pair of emulsion preparation drums 42–44, emulsion being prepared in one of the drums 42 while prepared emulsion is discharged into the system by way of the second of the drums. It will be understood that more than two drums may be utilized, if desired.

As shown with reference to the drum 42, a drum may comprise a closed container provided with suitable means such as a valve control hopper 46 for the introduction of aluminum chloride pellets and suitable means such as a charge line 48 controlled by a valve 50 for the introduction of an aromatic hydrocarbon. Preferably, the aromatic hydrocarbon is identical in composition with the fresh aromatic hydrocarbon feed stock charged by way of the line 14 to the reactor 10. A grid 52 formed of a suitable material such as expanded metal or wire screen, etc. is mounted within the drum 42 in order to provide a support for the introduced aluminum chloride pellets. A distributing ring 53 is mounted below the screen 52 for the dispersion of hydrogen chloride introduced by way of a hydrogen chloride charge line 54 controlled by a valve 55. An emulsion discharge line 56 controlled by a valve 58 is provided below the injection ring 53 and the grid 52 for supplying emulsion to the charge line 40.

It will be understood that the drum 44 will be of a similar construction, having an aluminum chloride hopper 46′, an aromatics charge line 48′, a hydrogen chloride charge line 54′, and an emulsion discharge line 56′.

The invention will be further illustrated by the following specific examples wherein the feed stock employed was a feed stock having the composition set forth in Table I. It will be understood, of course, that the examples are given by way of illustration and not as limitations on the scope of this invention.

TABLE I

*Inspections on feed stock*

Component analysis, wt. percent:

| | |
|---|---|
| 1,3,5 trimethylbenzene | 0.6 |
| 1,2,4 trimethylbenzene | 75.4 |
| 1,2,3 trimethylbenzene | 16.3 |
| Orthoethyltoluene | 0.6 |
| Metaethyltoluene | 0.7 |
| Isobutylbenzene | 0.7 |
| Secondary butylbenzene | 0.1 |
| Tert. butylbenzene | 0.4 |
| m-Cymene | 0.9 |
| Indan | 4.3 |
| | 100.0 |

EXAMPLE I

A reactor was provided including means for adding fresh feed stock and fresh methyl chloride and fresh aluminum chloride-containing emulsion on a continuous or semi-continuous basis. The reactor was also provided with suitable means for continually withdrawing and recovering the products of the reaction.

In a first run, the feed stock was added at the rate of about 2.8 pounds per hour and methyl chloride was added at the rate of about 1.6 pounds per hour. Other reaction conditions included an aluminum chloride concentration within the reactor of about 0.14 mol of aluminum chloride per mol of feed stock. Thus, about 0.5 pound of aluminum chloride was added at the beginning of the run. Reaction conditions included substantially atmospheric pressure, a temperature of about 250° F. and an average reaction time of about 30 minutes.

The reaction was continued on a continuous basis for a total of about 90 hours. Four hours after the beginning of the reaction and about every 4 hours thereafter there was added to the reactor about 0.25 pound of powdered aluminum chloride. A corresponding amount of aluminum chloride was withdrawn from the system before each injection of aluminum chloride. During the course of the run, aluminum chloride conversion was continually plotted. The plot of the run is reproduced as Fig. 2 of the drawing.

From Fig. 2, it will be observed that methyl chloride consumption was erratic during the course of the run and that the average methyl chloride conversion was about 6 mols of methyl chloride per hour which constitutes an average conversion of about 50 percent conversion of the methyl chloride. While not shown by the plot, it was found that about 0.0372 mol of aluminum chloride was consumed per mole of methyl chloride converted.

EXAMPLE II

The feed stock for this example was the same as the feed stock for Example I and the reactor was the reactor described above with respect to Example I. For the run of Example II the average reactor temperature was about 250° F. and substantially atmospheric pressure conditions were employed. The average residence time of the feed stock in the reactor was about 12 minutes. The difference in average residence time between Example I and Example II is not significant with respect to methyl chloride utilization inasmuch as the reaction of the methyl chloride with the aromatic feed components is very rapid, being almost instantaneous. The feed stock was charged at the rate of about 2.8 pounds per hour and methyl chloride was charged at the rate of about 1.4 pounds per hour to thereby provide a ratio of about 1.07 mols of methyl chloride per mol of oil. In this instance, however, an aluminum chloride-containing emulsion was continually charged to the reactor at a rate such that there was added to the reactor about 0.073 pound of aluminum chloride per hour. Thus, about 0.007 mol of aluminum chloride was charged per mol of methyl chloride. An equivalent amount of aluminum chloride in the form of "old" emulsion was continually discarded.

The "fresh" emulsion was prepared by placing aluminum chloride pellets in a container which had previously been filled with about 2 mols of feed stock per mol of aluminum chloride. Hydrogen chloride was bubbled through the vessel until the aluminum chloride had completely dissolved, whereby a homogeneous high density emulsion was formed.

As in the case of Example I, methyl chloride consumption was continually plotted during the course of the run. However, in this instance the methyl chloride consumption was linear, as shown in Fig. 2. Although it is not shown by the plot in Fig. 2, it was found that about 0.0121 mol of aluminum chloride was consumed per mol of methyl chloride converted.

EXAMPLE III

As another example, a xylenes feed stock was employed which contained about 0.1 weight percent of ethylbenzene, about 1.0 weight percent of paraxylene, about 9.7 weight percent of metaxylene, and about 89.2 weight percent of orthoxylene. The reaction was conducted at atmospheric pressure at a temperature of about 250° F. and the aluminum chloride concentration within the reactor was about 0.14 mol of aluminum chloride per mol of xylenes in the reactor. Methyl chloride was added at the rate of about 12 mols per hour and the xylenes feed stock was likewise added at the rate of about 12 mols per hour. At the eighth hour and every 8 hours thereafter during the run about 1.9 mols of powdered aluminum chloride was added. An equivalent amount of aluminum chloride was withdrawn at the time of addition. As in the case of Example I, erratic methyl chloride consumption occurred, the results obtained being set forth in Fig. 3 of the drawing.

From Fig. 3, it will be observed that methyl chloride consumption which was about 100 percent at the start of the run rapidly declined to about 10 percent at the end of the fourth hour and that periodic additions of aluminum chloride did not serve to provide for a sustained conversion of methyl chlorides in excess of 20 percent.

Having described our invention, what is claimed is:

1. In the continuous alkylation in a stirred reaction zone of a monoaryl compound selected from the group consisting of benzene, benzenes substituted with from one to five $C_1$ to $C_2$ alkyl groups and mixtures thereof with an alkylating agent selected from the group consisting of methyl chloride and ethyl chloride under liquid phase alkylation conditions in the presence of a catalytically effective amount of an emulsion, said emulsion containing aluminum chloride, hydrogen chloride and at least one of said monoaryl compounds in the molar ratio of about 1:1:2, the improvement which comprises separately preparing an emulsion by adding hydrogen chloride to a mixture of said selected monoaryl compound with aluminum chloride, fresh mixture containing about 2 mols of said selected compound per mol of aluminum chloride, said hydrogen chloride being added in an amount sufficient to provide a liquid emulsion containing aluminum chloride, hydrogen chloride, and said selected monoaryl compound in the molar ratio of about 1:1:2, continually adding said thus-prepared emulsion to said reaction zone in an amount within the range of about 0.00015 to about 1.0 mol of aluminum chloride per mol of feed stock charged to said reaction zone and continually withdrawing an equivalent amount of emulsion from said reaction zone.

2. A method as in claim 1 wherein the monoaryl compound is an ethylbenzene and the alkyl chloride is ethyl chloride.

3. A method as in claim 1 wherein the monoaryl compound is a methylbenzene and the alkyl chloride is methyl chloride.

4. A method as in claim 3 wherein the methylbenzene is a trimethylbenzene.

5. A method as in claim 3 wherein the methylbenzene is a xylene.

6. In a method for the continuous alkylation of a trimethylbenzene with methyl chloride in a stirred reaction zone in the presence of a catalytically effective amount of an emulsion containing aluminum chloride, hydrogen chloride and trimethylbenzene in the molar ratio of about 1:1:2 under atmospheric pressure liquid phase alkylation conditions, said emulsion being present in said reaction zone in an amount sufficient to provide from about 0.5 to about 0.04 mol of aluminum chloride per mol of trimethylbenzene, said alkylation conditions including a reaction temperature intermediate about 250° F. and the boiling point of said trimethylbenzene and a reaction time of less than about 20 minutes, the improvement which comprises continually replacing said emulsion in said reaction zone with an extraneously prepared emulsion at a rate sufficient to provide for the continuous addition of about 0.00015 to about 1.0 mol of aluminum chloride per mol of feed stock added to said reaction zone, said extraneously prepared emulsion having been prepared by adding hydrogen chloride to a mixture of fresh trimethylbenzene with aluminum chloride, said mixture containing about 2 mols of said trimethylbenzene per mol of aluminum chloride, said hydrogen chloride being added in an amount sufficient to provide a liquid emulsion containing aluminum chloride, hydrogen chloride, and said trimethylbenzene in the molar ratio of about 1:1:2.

7. In a method for the continuous alkylation of a xylene with methyl chloride in a stirred reaction zone in the presence of a catalytically effective amount of an emulsion containing aluminum chloride, hydrogen chloride and xylene in the molar ratio of about 1:1:2 under atmospheric pressure liquid phase alkylation conditions, said emulsion being present in said reaction zone in an amount sufficient to provide from about 0.5 to about 0.04 mol of aluminum chloride per mol of xylene, said alkylation conditions including a reaction temperature intermediate about 150° F. and the boiling point of said xylene and a reaction time of not more than about 2 hours, the improvement which comprises continually replacing said emulsion in said reaction zone with an extraneously prepared emulsion at a rate sufficient to provide for the continuous addition of about 0.00015 to about 1.0 mol of aluminum chloride per mol of feed stock added to said reaction zone, said extraneously prepared emulsion having been prepared by adding hydrogen chloride to a mixture of fresh xylene with aluminum chloride, said mixture containing about 2 mols of said xylene per mol of aluminum chloride, said hydrogen chloride being added in an amount sufficient to provide a liquid emulsion containing aluminum chloride, hydrogen chloride, and said xylene in the molar ratio of about 1:1:2.

References Cited in the file of this patent

UNITED STATES PATENTS

| | | |
|---|---|---|
| 2,222,012 | Amos et al. | Nov. 19, 1940 |
| 2,403,785 | Britton et al. | July 9, 1946 |
| 2,409,389 | Ringham | Oct. 15, 1946 |
| 2,443,247 | Howell | June 15, 1948 |

FOREIGN PATENTS

| | | |
|---|---|---|
| 711,793 | Great Britain | July 14, 1954 |